United States Patent [19]

Gagne

[11] Patent Number: 5,499,170
[45] Date of Patent: Mar. 12, 1996

[54] LIGHTING SYSTEM

[76] Inventor: Bertrand Gagne, 9560 Rue Ceres #301, Pierrefonds, Quebec, Canada, H8Y 3N4

[21] Appl. No.: 325,117

[22] Filed: Oct. 18, 1994

[51] Int. Cl.$^6$ .................................................. F21V 9/16
[52] U.S. Cl. .......................... 362/84; 362/153; 362/223; 362/240
[58] Field of Search .................................. 362/76, 81, 84, 362/146, 153, 223, 240, 249, 248, 800

[56] References Cited

U.S. PATENT DOCUMENTS

| | | | |
|---|---|---|---|
| 4,819,136 | 4/1989 | Ramsey | 362/81 |
| 5,408,395 | 4/1995 | Schmid et al. | 362/240 |
| 5,430,627 | 7/1995 | Nagano | 362/146 |

*Primary Examiner*—Stephen F. Husar
*Attorney, Agent, or Firm*—Donald E. Hewson

[57] ABSTRACT

A lighting track for use in public transportation vehicles comprises an outer track having upstanding walls connected together by a base portion, together defining a first retention channel. The upstanding walls have a downwardly facing first barrier portion. A receptacle has first and second side walls connected together by a spanning portion, together defining an second retention channel. The side walls have an upwardly facing second barrier portion, and a downwardly facing third barrier portion. When the receptacle is in place in the first retention channel, the first and second side walls are each selectively movable between a respective locking position where the second barrier portion is in intimate engagement with the first barrier portion and a respective unlocking position where the second barrier portion is removed from intimate engagement with the first barrier portion. A top cover has first and second side walls connected together by a lens. The side walls have an upwardly facing fourth barrier portion. A lighting element is disposed between the receptacle and the top cover. When the protective top cover is in place in the second retention channel of the receptacle and the receptacle is in place in the first retention channel of the outer track, the first and second barrier portions intimately engage each other in interfering relation, and the third and fourth barrier portions intimately engage each other in interfering relation, so as to lock the receptacle within the outer track and to lock the protective top cover within the receptacle.

20 Claims, 2 Drawing Sheets

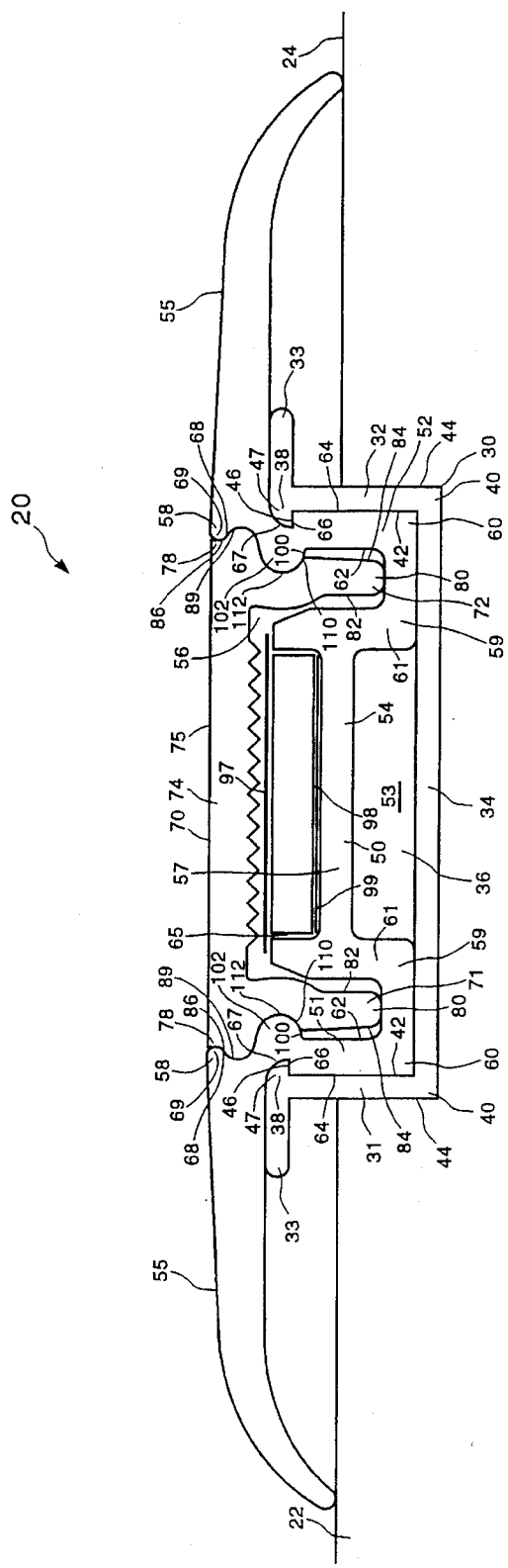

LIGHTING SYSTEM

FIELD OF THE INVENTION

This invention relates to emergency lighting systems used in public passenger vehicles, and more particularly to emergency lighting systems used in railway passenger cars, typically installed on or near the floor thereof.

BACKGROUND OF THE INVENTION

During routine daytime use, public transit vehicles, such as railroad passenger cars, are illuminated by means of daylight, and possibly some minor ambient artificial lighting. During nighttime use, general low level ambient lighting is used to guide passengers along a proper unobstructed routes to the exits; however, it has been found that such general low level lighting is potentially inadequate during emergency situations, which is when a lighting systems, especially one that guides passengers to exits, may be needed the most. Such emergency situations might include a railway passenger car being on fire and filling with smoke, or being driven off a bridge or trestle and thereby being at least partially submerged in water. Each of these types of emergency situations has been known to occur and has led to loss of life.

During a fire in a railway passenger car, the car tends to fill with smoke, except possibly for the bottom one or two feet of the car. It is therefore very difficult, if not impossible, for a passenger to see the closest exit. Typically, since the passenger may be panicking due to the flames, heat, and smoke, it is difficult to quickly determine which direction to head to the nearest exit. Exit signs, which are typically located near the ceiling at exit doors, cannot be seen. Often, passengers will spot a light and crawl on their hands and knees to that light, believing that the light is an exit; however, the light often turns out to be the fire itself. It is also quite easy in this type of situation for passengers to become somewhat trapped under the seats of the railway car, and even become injured or stuck. Further, corridors of railway passenger cars are typically quite narrow, which can lead to extreme congestion and confusion in an emergency situation.

It is also very common during such emergency situations, such as fire or immersion in water, for any lighting system to become inoperable by way of general damage, burning or melting of components, short circuiting, and so on. Further, typical lighting systems do not specifically lead and point to exits.

What is needed is an emergency low level lighting system that is on constantly and that is affected as minimally as reasonably possible by water, fire, smoke, physical abuse, and so on. Further, such emergency low level lighting systems should lead or point to exits, so that passengers may follow the lighting system to an exit during emergency conditions.

DESCRIPTION OF THE PRIOR ART

Most railway passenger car exits have a conventional exit sign located just below the ceiling of the car at the exit door. Such conventional exit signs often cannot be seen during emergency situations, or are readily damaged or short circuited, as the case may be, so as to become inoperable.

It is common in modern jet aircraft to have an emergency low level lighting system comprising a plastic tube with miniature incandescent lamps retained within the tube at intervals of about eight inches to ten inches the tube comprises two halves that snap together and is typically not resistant to being permeated by water and is also not resistant to physical abuse such as being stepped on by high-heeled shoes. Further, such systems are typically too thick for placement on a floor in the open, and must be placed along a junction of a floor and a wall so as to not present an object to be tripped over.

This type of prior art emergency low level lighting system is difficult to see, affords no directionality, is easily damaged, and shorts out if subjected to a substantial amount of moisture.

Emergency low level lighting systems must also be relatively thin to preclude passengers from tripping over it.

SUMMARY OF THE INVENTION

In accordance with one aspect of the present invention, there is provided a lighting track for use in public transportation vehicles. The lighting track comprises an outer track having first and second upstanding walls connected together in spaced apart relation by a base portion spanning therebetween so as to together define a first retention channel. The upstanding walls each have top and bottom edges, inner and outer faces, and a downwardly facing first barrier portion. A receptacle has first and second side walls connected together in spaced apart relation by a spanning portion spanning therebetween so as to together define a second retention channel. The side walls each having top and bottom edges, inner and outer faces, an upwardly facing second barrier portion, and a downwardly facing third barrier portion, and are shaped and dimensioned to fit closely between the first and second upstanding walls of the outer track. A protective top cover has first and second side walls connected together in spaced apart relation by a lens spanning therebetween. The side walls each having top and bottom edges, inner and outer faces, and an upwardly facing fourth barrier portion, and are shaped and dimensioned to fit closely between the first and second side walls of the receptacle. A lighting element shaped and dimensioned for placement between the receptacle and the top cover. At least one of the first and second side walls of the receptacle and the first and second upstanding walls of the outer track is movable between a respective locking position where the second barrier portion is in intimate engagement with the first barrier portion and a respective unlocking position where the second barrier portion is removed from intimate engagement with the first barrier portion. When the lighting track is assembled, the protective top cover is in place in the second retention channel of the receptacle and the receptacle is in place in the first retention channel of the outer track, such that the first and second barrier portions intimately engage each other in interfering relation and the third and fourth barrier portions intimately engage each other in interfering relation, so as to thereby retain the receptacle in releasable locking engagement within the outer track and to thereby retain the protective top cover in releasable locking engagement within the receptacle.

BRIEF DESCRIPTION OF THE DRAWINGS

Embodiments of this invention will now be described by way of example in association with the accompanying drawings in which:

FIG. 2 is an end elevational view of the lighting track of FIG. 1, with the components thereof assembled in an in-use configuration; and FIG. 3 is a sectional side view taken along section line 8—8 of FIG. 2.

DETAILED DESCRIPTION OF THE PREFERRED EMBODIMENTS

Figure 1:
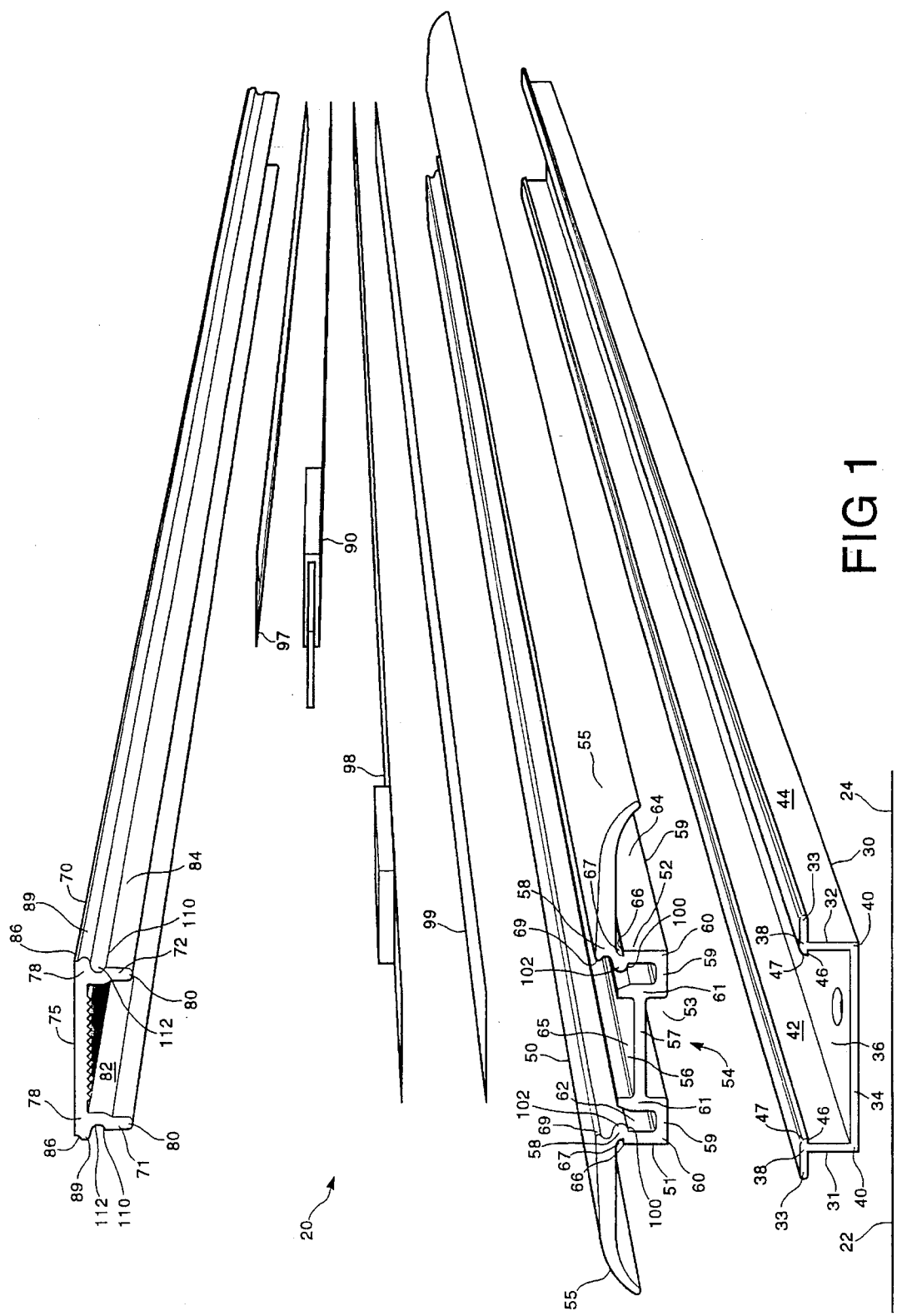
FIG. 1 is an exploded perspective view of the lighting track of the present invention.

Reference will now be made to FIGS. 1 through 7, which show the lighting track 20 of the present invention installed on the floor 22 of a public transportation vehicle 24. The lighting track 20 comprises a substantially rigid outer track 30, preferably made from an extruded aluminum material, and is therefore constant in cross section.

The outer track 30 is secured to the floor 22 by way of threaded fasteners 37 that extend through co-operating apertures in the base portion 34 of the outer track 30. A neoprene gasket may be used to separate the outer track 30 from the floor 22 of the public transportation vehicle 24. The outer track 30 has generally parallel first and second upstanding walls 31 and 32, each of the said first and second upstanding walls 31 and 32 having top and bottom edges 38 and 40, inner and outer faces 42 and 44 and a downwardly facing first barrier portion 46. The first and second upstanding walls 31 and 32 are connected together at their respective bottom edges 38 in spaced apart relation by a substantially flat base portion 34 spanning therebetween. The first and second upstanding walls 31 and 32 and the substantially flat base portion 34 together defined a first retention channel 36. Each of the first and second upstanding walls 31 and 32 of the outer track 30 has a supporting flange 33 projecting outwardly from the top edge 38 thereof, the purpose of which will be discussed subsequently.

Each of the downwardly facing first barrier portions 46 is disposed on the inner face 42 of the respective of the first and second upstanding walls 31 and 32 and is formed as a portion of a lip 47 extending inwardly from the top of the edge 38 of the respective first and second upstanding walls 31 and 32.

A receptacle 50 made from a soft pliable material such as SANTOPRENE™ is shaped and dimensioned for close fitting placement into the first retention channel 36 of the outer track 30 and has first and second side walls 51 and 52 connected together at their respective bottom edges 60 in space apart relation by a spanning portion 54 spanning therebetween. The first and second side walls 51 and 52 and the spanning portion 54 together define a second retention channel 56. Each of the first and second side walls 51 and 52 has a top edge 58 and bottom edge 60 and inner face 62 and an outer face 64, an upwardly facing second barrier portion 66, and a downwardly facing third barrier portion 68.

The receptacle 50 further comprises a continuous downwardly-open central channel 53 in the spanning portion 54 thereof. The spanning portion 54 has a raised central portion 57 above the downwardly-open central channel 53, and also has lower outer portions 59 that contact the base portion 34 of the outer track 30 in supporting relation, when the receptacle 50 is in place in the outer track 30. A pair of supporting walls 61 join the lower outer portions 59 and the central raised portion 57, thereby forming the outwardly open outer channels 63 between each of the supporting walls 61.

The receptacle 50 further comprises the pair of protective ramp members 55, with one of the ramp members 55 extending outwardly from the top edge 58 of each of the first and second side walls 52. Each of the ramp portions 55 is directed slightly downwardly so as to meet the floor 22 of the public transportation vehicle 24, so as to thereby provide a smooth physical transition from the floor 22 to the top 75 of the lens 74 of the protective top cover 70. The protective ramp members 55 are included as to preclude a person from tripping over the lighting track 20 of the present invention installed on a floor 22 of the public transportation vehicle 24, and also to allow a wheeled vehicle, such as a carriage, to be readily maneuverable over the lighting track 20. The supporting flanges 33 that project outwardly from the top edge of the first and second upstanding walls 31 and 32 are shaped and dimensioned to contact in supporting relation the underside of a respective one of the protective ramp members 55.

Each of the upwardly facing second barrier portions 66 is disposed on the outer face 64 of the respective of the first and second side walls 51 and 52 of the receptacle 50, and is formed as a portion of a channel 67 in the outer face 64 of the respective of the first and second side walls 52 of the receptacle 50. Each of the downwardly facing third barrier portions 68 is disposed on the inner face 62 of the respective of the first and second side walls of the receptacle 50, and is formed as a portion of a lip 69 extending outwardly from the top edge 58 of the respective of the first and second upstanding walls 71 and 72.

In the preferred embodiment, the first and second side walls 51 and 52 of the receptacle 50 are each moveable between a respective locking position where the second barrier portion 66 of the first and second side walls 52 is in intimate engagement with a respective one of the first barrier portions of the first and second upstanding walls 31 and 32 of the outer track 30, and a respective unlocking position where each of the second barrier portions 66 is removed from intimate engagement with the respective first barrier portions 46.

There is also a protective top cover 70 shaped and dimensioned for placement into the second retention channel 56 of the receptacle 50. The protective top cover 70 has first and second sidewalls 71 and 72, with each of the first and second sidewalls 71 and 72 each having a top edge 78, a bottom edge 80, an inner face 82, an outer face 84, and an upwardly facing fourth barrier portion 86. The first and second sidewalls are connected together at their perspective top edges 78 and spaced apart relation by a lens 74 spanning therebetween. The protective top cover 70 is preferably made by a clear and strong material, such as polycarbonate.

Each of the upwardly facing fourth barrier portions 86 is disposed on the outer face 82 of the respective of the first and second side walls 72 of the protective top cover 70, and is formed as a portion of a lip 89 extending outwardly from the top edge 78 of the respective first and second side walls 72 of the protective top cover 70.

The first and second sidewalls 71 and 72 of the protective cover 70 depend from the lens 74, so as to extend one each to a respective one of the pair of outer channels 63 in the receptacle 50.

The receptacle 50 further comprises a downwardly facing fifth barrier portion 100 formed as a portion of a lip 102 extending inwardly from the inner face 62 of the respective first and second side walls 51 and 52. The protective top cover 70 further comprises an upwardly sixth barrier portion 110 in each of the first and second side walls 71 and 72 of the protective top cover 70. Each of the upwardly facing sixth barriers 110 is formed as a portion of a channel 112 in the outer face 84 of the respective first and second side walls 71 and 72.

The receptacle 50 also has a recess 65 formed in the raised central portion 57, with the said recess 65 being shaped and dimensioned to receive an electroluminescent lighting element 90 therein. The electroluminescent lighting element 90 is thereby disposed between the receptacle 50 and the protective top cover 70, and is retained in place by way of double sided tape 51. A strip of transparent material 97 having directionality arrows thereon may be included on top of the electroluminescent lighting element 90. A flat electrical conductor 98 is disposed directly underneath the electroluminescent lighting element 90, and is connected in electrically conductive relation therewith, so as to provide electrical power thereto. The flat electrical conductor 90 is also connected in electrically conductive relation to a source of electrical power (not shown) by way of suitable electrically conductive wires 95.

When the lighting track 20 is assembled, the receptacle 50 is in place in the first retention channel 36 of the outer track 30, and the protective top cover 70 is in place in the second retention channel 56 of the receptacle 50. Accordingly, the first and second barrier portions 46 and 66 intimately engage each other in interfering relation, the third and fourth barrier portions 68 and 86 intimately engage each other in interfering relation, and the fifth and sixth barrier portions 100 and 110 intimately engage each other in interfering relation. In this manner, with the various barrier portions engaging other respective barrier portions in interfering relation, the receptacle 50 is retained in releasable lock engagement within the outer track 30, and the protective top cover 70 is retained in releasable lock engagement within the receptacle 50.

The receptacle 50 and the top protective cover 70 are preferably each made from a water resistant material and have no perforations therein so as to preclude water from entering the space between the receptacle 50 and the top protective cover 70 and reaching the electroluminescent lighting element 90. Further, the receptacle 50 and the top protective cover 70 fit together in snug fitting relation along their entire respective lengths so as to preclude water from passing between the respective first and second side walls thereof, and entering the space between the receptacle 50 and the protective top cover.

The lighting track 20 of the present invention further comprises a pair of end caps 120 secured to the outer track 30 at each end thereof by way of threaded fasteners 122 respectively engaging co-operating threaded posts 124 extending outwardly from the base portion 34 of the outer track 30.

It is contemplated that the lighting track 20 of the present invention could also be installed on walls (not shown) of a public transportation vehicle 24. Further, in an alternative embodiment of the lighting track of the present invention, only one protective ramp member 55 is included so as to permit the lighting track 20 to be installed at the vertex between the floor 22 and a wall.

Other modifications and alterations may be used in the design and manufacture of the apparatus of the present invention without departing from the spirit and scope of the accompanying claims.

What is claimed is:

1. A lighting track for use in public transportation vehicles, said lighting track comprising:

an outer track having first and second upstanding walls connected together in spaced apart relation by a base portion spanning therebetween so as to together define a first retention channel, said upstanding walls each having top and bottom edges, inner and outer faces, and a downwardly facing first barrier portion;

a receptacle having first and second side walls connected together in spaced apart relation by a spanning portion spanning therebetween so as to together define a second retention channel, said side walls each having top and bottom edges, inner and outer faces, an upwardly facing second barrier portion, and a downwardly facing third barrier portion, and being shaped and dimensioned to fit closely between said first and second upstanding walls of said outer track;

a protective top cover having first and second side walls connected together in spaced apart relation by a lens spanning therebetween, said side walls each having top and bottom edges, inner and outer faces, and an upwardly facing fourth barrier portion, and being shaped and dimensioned to fit closely between said first and second side walls of said receptacle;

a lighting element shaped and dimensioned for placement between said receptacle and said top cover;

wherein, at least one of said first and second side walls of said receptacle and said first and second upstanding walls of said outer track is movable between a respective locking position where said second barrier portion is in intimate engagement with said first barrier portion and a respective unlocking position where said second barrier portion is removed from intimate engagement with said first barrier portion; and wherein, when said lighting track is assembled, said protective top cover is in place in said second retention channel of said receptacle and said receptacle is in place in said first retention channel of said outer track, such that said first and second barrier portions intimately engage each other in interfering relation and said third and fourth barrier portions intimately engage each other in interfering relation, so as to thereby retain said receptacle in releasable locking engagement within said outer track and to thereby retain said protective top cover in releasable locking engagement within said receptacle.

2. The lighting track of claim 1, wherein each of said downwardly facing first barrier portions is disposed on said inner face of the respective of said first and second upstanding walls and each of said upwardly facing second barrier portions is disposed on said outer face of the respective of said first and second side walls of said receptacle.

3. The lighting track of claim 2, wherein each of said downwardly facing first barrier portions is formed as a portion of a lip extending inwardly from said top edge of the respective of said first and second upstanding walls and said upwardly facing second barrier portion is formed as a portion of a channel in said outer face of the respective of said first and second side walls of said receptacle.

4. The lighting track of claim 3, wherein each of said downwardly facing third barrier portions is disposed on said inner face of the respective of said first and second side walls of said receptacle and each of said upwardly facing fourth barrier portions is disposed on said outer face of the respective of said first and second side walls of said protective top cover.

5. The lighting track of claim 4, wherein each of said downwardly facing third barrier portions is formed as a portion of a lip extending outwardly from said top edge of the respective of said first and second upstanding walls and said upwardly facing fourth barrier portion is formed as a portion of a lip extending outwardly from said top edge of the respective of said first and second side walls of said protective top cover.

6. The lighting track of claim 5, wherein said receptacle further comprises a downwardly facing fifth barrier portion and said protective top cover further comprises an upwardly facing sixth barrier portion, and wherein, when said protective top cover is in place in said second retention channel of said receptacle and said receptacle is in place in said first retention channel of said outer track, said fifth and sixth barrier portions intimately engage each other in interfering relation, so as to thereby retain said protective top cover in locked relation within said receptacle.

7. The lighting track of claim 6, wherein each of said downwardly facing fifth barrier portions is formed as a portion of a lip extending inwardly from said inner surface of the respective of said first and second side walls and each of said upwardly facing sixth barrier portions is formed as a portion of a channel extending inwardly from said outer face of the respective of said first and second side walls of said protective top cover.

8. The lighting track of claim 1, wherein said first and second side walls are each movable between a respective locking position where said second barrier portion is in intimate engagement with said first barrier portion and a respective unlocking position where said second barrier portion is removed from intimate engagement with said first barrier portion.

9. The lighting track of claim 1, wherein said receptacle further comprises a protective ramp member extending outwardly from the top edge of each of said first and second side walls thereof, with each of said ramp portions being directed slightly downwardly.

10. The lighting track of claim 1, further comprising a continuous downwardly-open central channel in the spanning portion of said receptacle.

11. The lighting track of claim 10, wherein said receptacle has a raised central portion above said downwardly-open central channel, lower outer portions that contact said base portion of said outer track, and a pair of supporting walls adjoining said lower outer portions and said central raised portion, thereby forming upwardly-open outer channel between each of said supporting walls.

12. The lighting track of claim 11, wherein said first and second side walls of said protective cover depend from said lens so as to extend one each into a respective one of said upwardly-open outer channels in said receptacle.

13. The lighting track of claim 1, wherein said receptacle has a recess therein shaped and dimensioned to receive said lighting element therein.

14. The lighting track of claim 8, wherein each of said first and second upstanding walls of said outer track has a supporting flange projecting outwardly from the top edge thereof, the supporting flanges being shaped and dimensioned to contact in supporting relation the underside of a respective one of the protective ramp members.

15. The lighting track of claim 1, wherein said outer track is substantially rigid.

16. The lighting track of claim 1, wherein said base portion of said outer track is substantially flat.

17. The lighting track of claim 1, wherein said lighting element is an electroluminescent lighting element.

18. The lighting track of claim 1, wherein said receptacle is made from a soft pliable material.

19. The lighting track of claim 1, wherein said receptacle is made from a water resistant material.

20. The lighting track of claim 1, further comprising a pair of end caps secured to said outer track at each ends thereof.

* * * * *